W. Bicknell,
Crank Motion.
N° 68,482.      Patented Sep. 3, 1867.
Fig: 1.
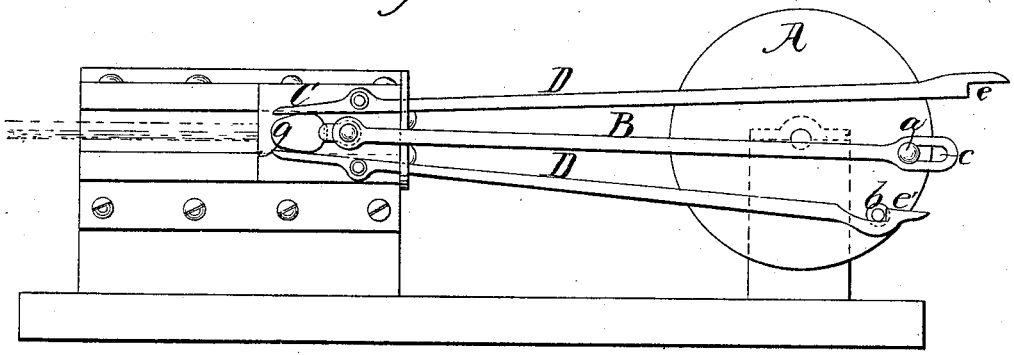
Fig: 2.
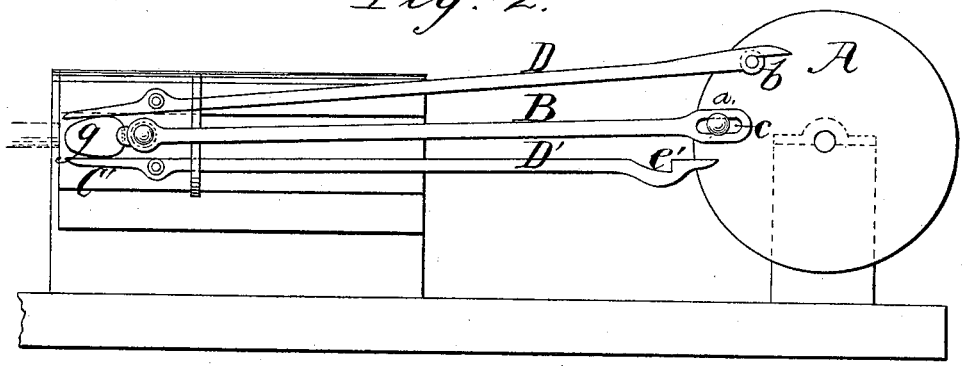
Witnesses;
Wm Trevain
F. Blockley
Inventor;
Wm Bicknell
Per. Munn & Co
Attys.

United States Patent Office.

WILLIAM BICKNELL, OF HARTFORD, MAINE, ASSIGNOR TO HIMSELF AND ALFRED BICKNELL, OF SOUTH READING, MASSACHUSETTS.

Letters Patent No. 68,482, dated September 3, 1867.

IMPROVEMENT IN CRANK-MOTION.

The Schedule referred to in these Letters Patent and making part of the same.

TO ALL WHOM IT MAY CONCERN:

Be it known that I, WILLIAM BICKNELL, of Hartford, in the county of Oxford, and State of Maine, have invented a new and useful Improvement in Crank-Motion; and I do hereby declare that the following is a full, clear, and exact description thereof, which will enable those skilled in the art to make and use the same, reference being had to the accompanying drawings, forming part of this specification, in which—

Figure 1 is a side view of an engine cross-head with my improved crank-motion device connected, when the crank is passing one of its dead-centres, and Figure 2 is a similar view of the same, when the crank is passing the opposite dead-centre.

Similar letters of reference indicate corresponding parts.

The nature of this invention consists in arranging two or more auxiliary connecting-rods with the pitman and cross-head of a steam engine, for the purpose of enabling the engine to start from any point at which the piston may have been stopped, or any position of the crank, and also to enable the piston to exert its power more advantageously and economically in passing the dead-centres than can be done with a pitman alone in the ordinary connection.

A represents a disk or plate-crank on a driving-shaft connected by the wrist-pin $a$ with the pitman B, which, as usual, is connected with the cross-head C of an engine. The wrist-pin $a$ works in a slot, $c$, in the end of the pitman, and near it is another pin, $b$, on the side of the crank-plate A, and near its periphery. On the opposite sides of the pitman are auxiliary connecting-rods D D', one of which, D', is provided with a projection or shoulder, $e$, which engages the pin $b$ when the piston has reached the extreme end of the cylinder furthest from the crank just after the turn of the "dead-centre" on that side, and as the piston moves on its return the rod D turns the crank until the wrist-pin $a$ traverses the slot $c$, when the pitman B takes up the movement and continues the work until the piston completes the stroke and reaches the end of the cylinder nearest the crank; the other auxiliary rod D' engages the pin $b$ by a hook, $e'$, and turns the crank as the piston moves back, until the wrist-pin has traversed to the other end of the slot again, when the pitman again takes effect and continues the movement to the end of the stroke, to be again taken up on the return stroke of the piston by the pushing auxiliary rod D, as previously described, thus converting rectilinear reciprocating into rotary motion without loss of speed in passing the "dead-centres." The auxiliary rods D D' are pivoted to the cross-head at $d\ d'$, near the connection of the pitman and the rear end, and extend far enough back to bear on an elliptical spring, $g$, secured to the cross-head behind the end of the pitman, by which spring the forward ends of the auxiliary rods are alternately thrown promptly into engagement with the pin $b$, at the end of the stroke of the piston, as before described.

Having thus described my invention, I claim as new, and desire to secure by Letters Patent—

The employment of two or more auxiliary rods D D', in combination with the pitman and crank of a reciprocating engine, arranged and operating substantially as and for the purpose herein described.

WILLIAM BICKNELL.

Witnesses:
WM. E. BICKNELL,
J. F. INGALLS.